Figure 1:
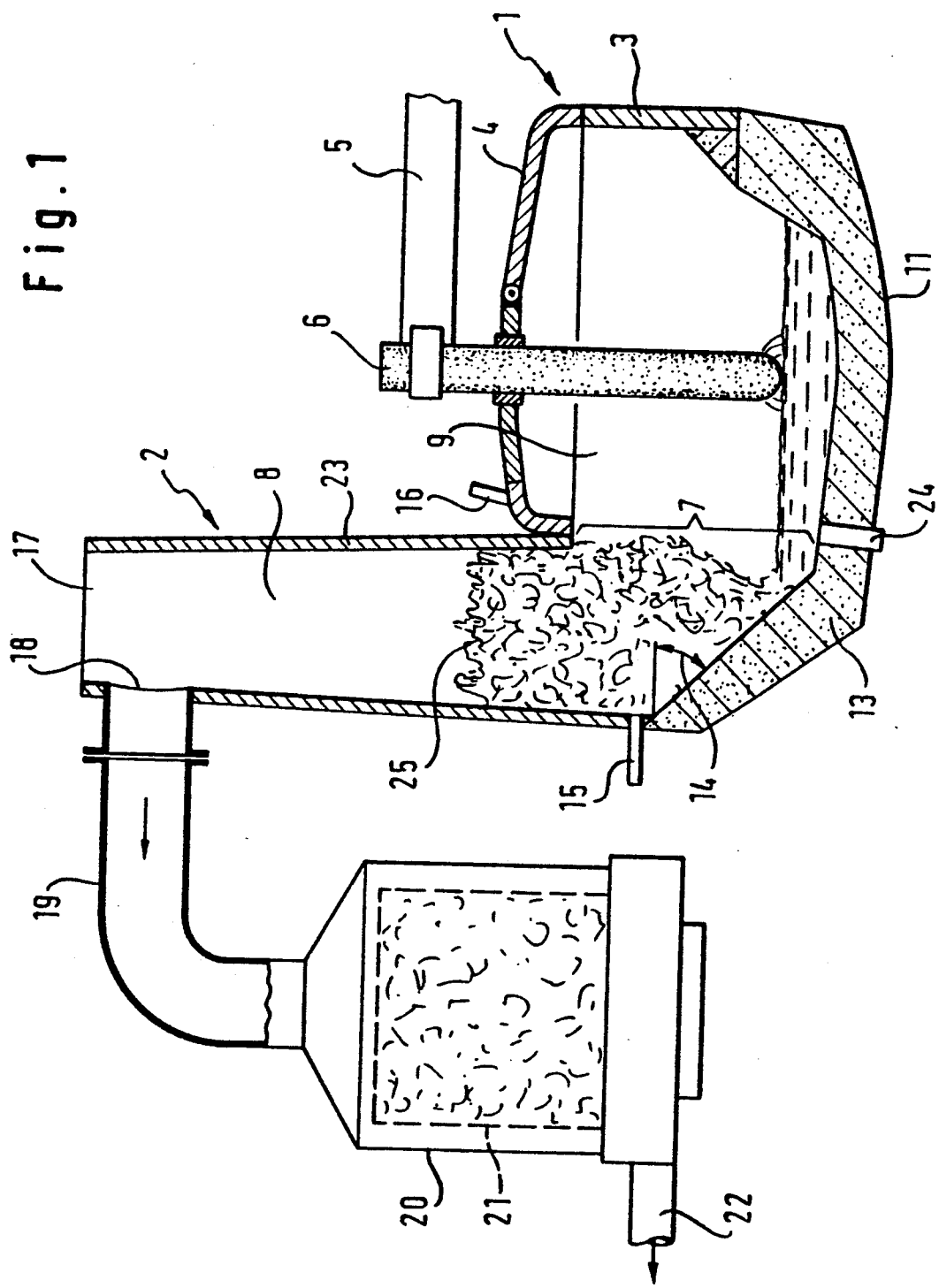

United States Patent [19]

Ehle et al.

[11] Patent Number: 5,117,438
[45] Date of Patent: May 26, 1992

[54] METHOD OF OPERATING A SMELTING UNIT AND SMELTING UNIT FOR THAT METHOD

[75] Inventors: Joachim Ehle, Lautenbach; Gerhard Fuchs, Kehl-Bodersweier, both of Fed. Rep. of Germany

[73] Assignee: Fuchs Systemtechnik GmbH, Fed. Rep. of Germany

[21] Appl. No.: 427,618

[22] Filed: Oct. 26, 1989

[30] Foreign Application Priority Data

Nov. 18, 1988 [DE] Fed. Rep. of Germany ....... 3839095

[51] Int. Cl.[5] ............................................. F27D 13/00
[52] U.S. Cl. ........................................ 373/80; 373/2; 373/18; 373/63; 373/81
[58] Field of Search ............... 373/2, 60, 80, 18, 34, 373/81, 46, 63, 66

[56] References Cited

U.S. PATENT DOCUMENTS

| | | |
|---|---|---|
| 3,441,651 | 4/1969 | Vieno et al. ........................ 373/80 |
| 4,385,889 | 5/1983 | Yasukawa ........................... 373/80 |
| 4,617,673 | 10/1986 | Fuchs et al. ....................... 373/80 |
| 4,827,486 | 5/1989 | Brotzmann et al. ............... 373/2 |

Primary Examiner—Bruce A. Reynolds
Assistant Examiner—Tu Hoang

[57] ABSTRACT

In a smelting unit comprising an arc furnace and at least one shaft-like charging material preheater which is arranged laterally on the furnace vessel of the arc furnace and the interior of which is connected in a region adjoining its bottom to the interior of the furnace vessel by way of a connecting zone, and in addition burners open in the lower region of the charging material preheater, in a sump mode of operation after the tapping step, of the amount of charging material which is required for the next bath of molten material, a part thereof is charged directly into the furnace vessel in order to reduce the smelting time. That part of the charging material is preheated in a preheating chamber which is connected downstream of the charging material preheater.

17 Claims, 2 Drawing Sheets

METHOD OF OPERATING A SMELTING UNIT AND SMELTING UNIT FOR THAT METHOD

The invention relates to a method and a smelting unit as set forth below.

German utility model No 84 12 739 discloses a method and an apparatus of that kind.

In the known method the charging material is charged into a metal sump in the furnace vessel, by means of a shaft-like scrap preheater. It is only for the purposes of producing a metal sump in the furnace hearth for the first time that that method also provides for introducing scrap directly into the furnace vessel by means of a scrap basket.

With that mode of operation, there is the problem that, after the tapping operation and after the arc has been re-lit, the electrical energy introduced is restricted by the bath temperature which is high at that time. The residual sump which remains in the furnace vessel after the tapping operation cools down to such a slight extent, during that short time, that only a small amount of electrical energy can be introduced, in order to avoid overheating the bath. After the burners are ignited, it is necessary to wait about 15 to 20 minutes until the burners have melted so much charging material in the lower region of the shaft-like charging material preheater that the temperature of the bath in the furnace vessel, by virtue of the molten material which flows thereto at comparatively low temperature, has sufficiently cooled down that a high level of electrical energy can be introduced again. The capacity which is available for the smelting operation can therefore not be utilised in the initial phase so that the smelting time is correspondingly increased.

The object of the present invention is to provide a method of operating a smelting unit, and a smelting unit, in which the maximum amount of energy can be supplied even at the beginning of the smelting process, and in that way the smelting process can be shortened.

This object is attained by providing an apparatus and a method in which after a tapping operation, a part of charging material required for the next melting is charged directly into the furnace vessel and the remainder of the charging material is charged directly into the charging material preheater.

With that mode of operation, it is possible for the part of the amount of charging material which was introduced into the furnace vessel directly by way of the cover to be immediately melted with a high level of electrical power, in the initial phase of the smelting process. It is advantageous in that respect for the walls of the furnace vessel to be protected from direct electric arc irradiation by the charging material, for example steel scrap, into which the arcs burn. In parallel to the operation of charging the part of the charging material which is introduced into the furnace vessel, the remaining part is introduced into the shaft-like charging material preheater as quickly as possible from the technical point of view and, when the preheater is very substantially filled, the burners in the lower region of the charging material preheater are also lit so that the entire melting process is set in operation with the full introduction of energy both by means of the electric arcs and also by means of the burners.

For an optimum mode of operation, matching as between the energy introduced by the electric arc or arcs and the energy introduced by the burners is necessary. If too much burner energy is introduced in relation to the electric arc energy, then the charging material in the preheater melts down rapidly, but the electrical energy which is converted into heat by the arcs is not sufficient, with an excessively low level of output, for the charging material which is introduced directly into the furnace vessel to be melted down sufficiently quickly and for the steel at the same time to be brought to the desired tapping temperature, with the increase in the volume of liquid steel. Conversely, with an excessively high level of electrical energy being introduced, in comparison with the burner energy, the melting time in respect of the column of charging material in the preheater is too long, compared to the smelting time of the material which is charged directly into the furnace vessel, by means of electrical energy, and in comparison with the bath heating-up time. The ratio of arc energy introduced to burner energy introduced should desirably lie in the range of from 6:1 to 2:1. With a method which has been tried out in practice, in which 30% of the amount of charging material required for a melting operation was charged directly into the furnace vessel, with the remainder being introduced by way of the preheater, the ratio of 5:1 gave very good results. However the ratio is dependent not only on the way in which the charging material is distributed to the furnace vessel and the preheater, but also on the nature of the respective charging material involved. The ratio should be set in consideration of the point that, with a high level of electric arc power, the entire amount of charging material required for a melting operation can be melted and brought to the tapping temperature within a very short time.

A further parameter which affects matters in this connection is the amount of residual molten material which remains in the furnace vessel after the tapping operation when using the intended sump mode of operation. In the method which was tried out, about 50% of the tapping weight was retained as residual molten material in the furnace vessel, in the tapping operation.

The introduction of a part of the charging material into the furnace vessel solves a further problem which arises when scrap of different sizes is to be smelted. If what is known as heavy scrap is charged into the shaft-like preheater, then that can give rise to blockages therein, particularly when, as in the case of the smelting unit referred to in the opening part of this specification, the bottom of the preheater drops away towards the hearth bottom at a comparatively shallow angle of inclination and the flow cross-section through the connecting zone between the preheater and the furnace vessel is not of sufficiently large size. If the conditions in respect of the flow of material in the scrap preheater and from same into the furnace vessel are improved by an increase in the angle of inclination of the bottom and by arranging for the connecting zone to be of the largest possible flow cross-section, there is then the risk that, when using scrap which varies in size, the scrap may pass in an uncontrolled fashion and with a thrusting movement into the furnace hearth by way of the connecting zone, in particular also when the furnace vessel is involved in a tilting movement which is performed to carry out the tapping operation, whereby not only does it become impossible precisely to control the tapping volume, but there is also an increased risk of electrode fractures in respect of the electrodes which are disposed in the vicinity of the connecting zone, by virtue of scrap material collapsing into the furnace hearth. If the heavy scrap is charged by way of the cover and the medium and light scrap is charged by way of the shaft-like charging material preheater, in which respect the latter is run empty for each melting operation, then the above-indicated problems are overcome, in particular if the bottom of the preheater is designed with a larger angle of inclination than 30° and the flow cross-section of the connecting zone is made as large as possible.

With such a mode of operation which is used for reasons relating to the fact that it is not possible exactly to control the flow of material, it is of course not possible for the hot furnace waste gases to be utilised throughout the entire smelting and refining process, for preheating the scrap in the charging material preheater. In order nonetheless to permit that to be done, in accordance with a further development of the invention, disposed downstream of the shaft-like charging material preheater is a preheating chamber which is suitable for accommodating a container filled with charging material The part of the charging material which is to be charged directly into the furnace vessel is introduced into the container and preheated by the gases which are drawn from the gas outlet of the shaft-like charging material preheater during the preceding smelting process. In that way it is possible to utilise the thermal energy of the furnace waste gases throughout the entire smelting and refining phase. Preferably light and medium scrap is fed to the shaft-like charging material preheater. Essentially heavy scrap or heavy and medium scrap is heated in the preheating chamber. The carbon content of the molten material can be influenced in the desired manner by introducing carbon or crude iron in lump or granulate form and heat energy can be additionally introduced by injecting oxygen into the molten material.

During the smelting process in which the material which is liquefied in the lower region of the column of charging material is fed to the molten bath in the furnace hearth, which, by virtue of the electrical energy supplied thereto, is at a higher temperature than the material flowing thereto from the preheater, it is advantageous for scavenging gases to be injected to improve mixing of the molten material, in particular in the region between the middle of the furnace vessel and the vertical extension of the preheater shaft wall which is adjacent to the furnace vessel. For that purpose, provided in the bottom of the furnace vessel are under-bath nozzles or gas-pervious bottom scavenging bricks, through which for example inert gases are injected. It is also possible for the molten material to be mixed by means of movable ultrasonic oxygen lances. That not only provides for rapid temperature equalisation but also provides for the desired homogeneity of the molten material.

Figure 2:
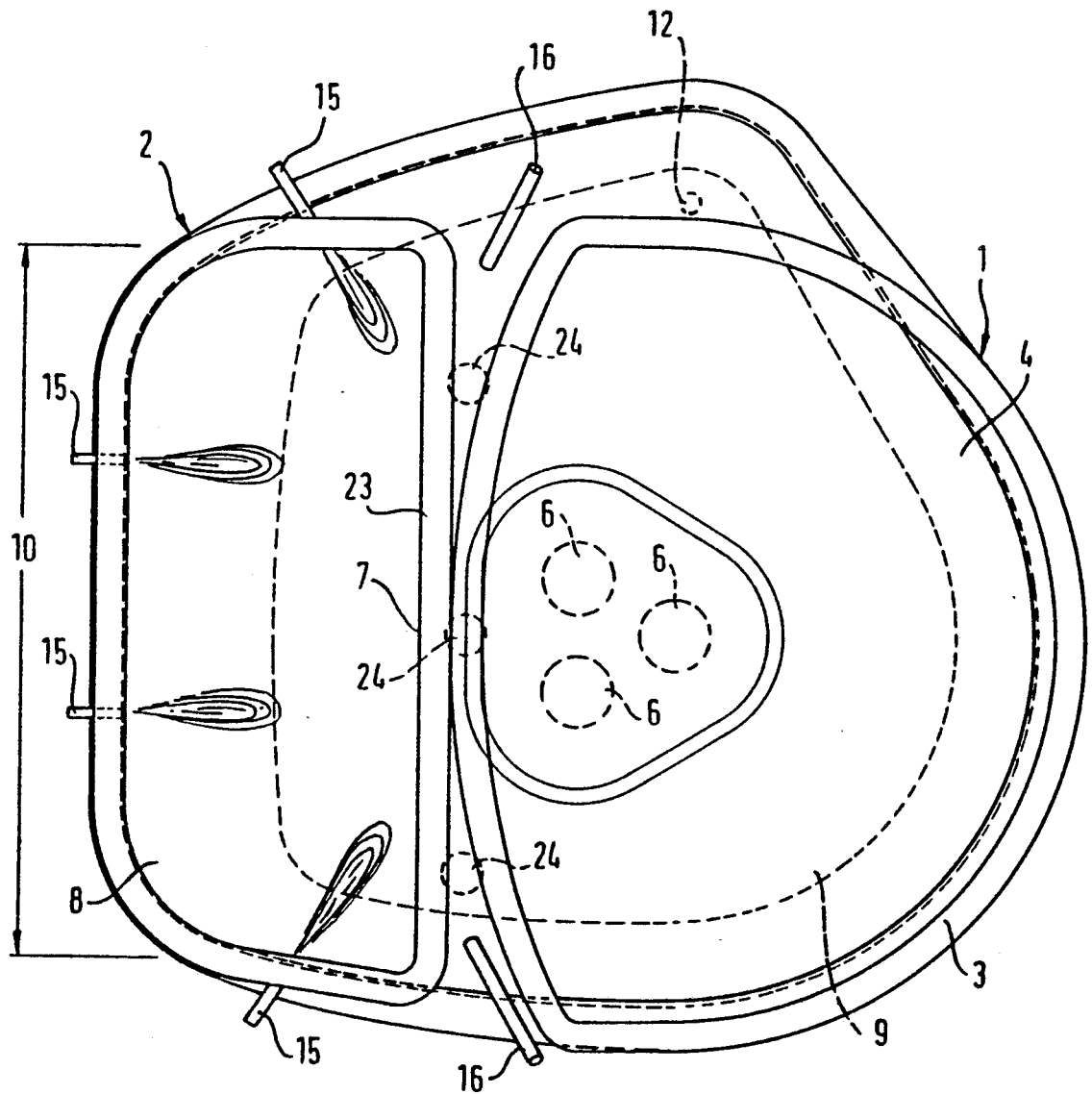

The invention will now be described in greater detail by means of an embodiment with reference to two Figures of drawings in which:

FIG. 1 is a view in longitudinal section of a smelting unit for carrying out the method according to the invention, and FIG. 2 is a plan view of the FIG. 1 unit.

The smelting unit shown in the drawings comprises an electric arc furnace 1 and a shaft-like charging material preheater 2. The electric arc furnace 1 includes a furnace vessel 3 with a cover 4 which can be pivoted away and through which three electrodes 6 which are carried by carrier arms 5 and which can be pivoted laterally and lifted by means of a lifting and pivoting means can be introduced into the furnace vessel.

The charging material preheater 2 is arranged laterally on the furnace vessel 3 and is of an almost rectangular configuration in cross-section (see FIG. 2). The furnace vessel is cut away in a segment-like configuration on the side towards the charging material preheater and is without a side wall at that location so that the connecting zone 7 between the interior 8 of the charging material preheater and the interior 9 of the furnace vessel extends approximately over the entire width 10 of the preheater 2 and almost over the entire height of the arc furnace. The lined furnace hearth which accommodates the molten material is indicated by reference numeral 11 and has an eccentrically arranged tap hole 12. The furnace vessel 1 and the preheater 2 which is integrated therewith can be tilted in known manner about their connecting axis, that is to say in FIG. 2 about a horizontal axis, for carrying out the tapping operation. The lined bottom 13 of the preheater 2 drops away towards the bottom of the furnace hearth 11 at an angle of inclination 14 of about 45°. In addition the cross-section of the interior 8 of the preheater 2 is enlarged in a downward direction so that, in conjunction with the comparatively large flow cross-section in the connecting zone 7, that arrangement guarantees a good flow of material into the hearth chamber. Burners or nozzles 15 open in the lower region of the charging material preheater 2, above the lining. The arrangement also has burners or nozzles 16 which are directed towards the connecting zone 7. In the upper region the charging material preheater 2 has a closable charging opening 17 as well as a gas outlet 18. The gas outlet 18 is connected by way of a gas pipe 19 to a preheating chamber 20 which is suitable for accommodating a container or scrap basket 21 which is filled with charging material. A gas pipe 22 goes from the preheating chamber 20 to a chimney. As can be seen from FIG. 2, the electrodes 6 are not arranged in the middle of the furnace vessel but are displaced towards the shaft-like charging material preheater 2. In that way the radiant heat produced by the arcs can act to an enhanced degree on the charging material which is supplied by way of the charging material preheater and at the same time the radiant heat loading on the free wall regions of the arc furnace can be reduced. In order to improve mixing of the molten material, scavenging bricks 24 through which a scavenging gas can be introduced are arranged in the bottom of the furnace vessel in the vicinity of the vertical extension of the shaft wall 23 which is adjacent to the furnace vessel. Scavenging bricks of that kind may also be disposed at another location in the bottom of the furnace vessel. Preferably however they are disposed in the region between the electrodes and the vertical extension of the shaft wall 23.

The method of operating the above-described smelting unit will now be explained.

When tapping a molten bath by tilting the arc furnace 1 and the preheater 2 which is integrated therewith, after removal of the electrodes and uncoupling the preheater 2 from the gas pipe 1, a residual molten material which makes up about 50% of the tapping weight is left in the furnace vessel. In the preceding smelting process, all the batch material from the shaft-like charging material preheater had been melted and the charging material of a scrap basket 21 which was introduced into the preheating chamber 20 had been heated up. After the furnace vessel has been tipped back, the furnace cover 4 is pivoted aside and the content of the scrap basket 21 which has been removed from the preheating chamber 20 is charged directly into the furnace vessel on to the residual sump disposed therein. After the scrap basket 21 was removed from the preheating chamber 20, a fresh scrap basket was immediately introduced into same. Immediately after the furnace vessel was tilted back, the operation of charging the shaft-like charging material preheater 2 had already been begun, with the charging operation requiring a few minutes because of the smaller charging opening 17 and the larger amount of charging material. When the method was carried out, 30% of the total scrap weight was charged by way of the cover and 70% was charged into the charging material preheater.

Directly after the operation of charging the content of the scrap basket into the furnace vessel, the cover is pivoted back into position and the arc smelting process is begun after the electrodes had been introduced into the furnace vessel. In that situation, it is possible in this case to operate at full power as the walls of the vessel are protected from the direct effect of the arcs by scrap and the residual sump cannot be overheated. After the operation of charging the material into the preheater 2 is concluded, the charging opening 17 thereof is closed and the burners 15 and 16 are set in operation. Scavenging gas is also introduced through the scavenging bricks 24.

At the same time as the arcs burn into the charging material which was directly introduced into the furnace vessel 3, and at the same time as that part of the charging material begins to melt, the lower region of the column 25 of charging material, that is to say the part of the total amount which was introduced into the preheater 2, is also melted by the burners 15 and 16, assisted by the heat of the arcs. In that situation the hot waste gases from the furnace vessel and the burners preheat the column 25 of charging material and in addition the charging material in the scrap basket 21, which is in the preheating chamber 20. The more the smelting process proceeds, the more the column 25 of charging material moves downwardly and the higher becomes the temperature of the heating gases which are introduced into the preheating chamber 20 by way of the gas pipe 19.

With the method effected, the ratio of electric arc energy introduced to burner energy introduced was set to about 5:1. Local overheating of the bath, when the column 25 of charging material was not yet completely melted, was resisted by virtue of the fact that the molten material which flows over the relatively sharply inclined bottom 13, at comparatively low temperature, was well mixed in the vicinity of the connecting zone with the hotter molten material in the furnace hearth 11. In that way it is possible to operate with a high level of electrical energy throughout the entire smelting process, after the part which was charged directly into the furnace vessel has been melted down. It is only in the refining operation, when the entire amount of charging material in the charging material preheater has been melted down, that the level of electrical energy is cut back to such an extent that the arc length is about 200 mm. That length can be covered by a layer of slag to such an extent that the furnace walls are also protected from direct arc irradiation in the refining process.

After the refining process, when the molten material has reached the tapping temperature, a part thereof is tapped off and the smelting process is repeated for the next bath of molten material in the above-described manner.

We claim:

1. A method of operating a smelting unit comprising an electric arc furnace including a furnace vessel and a furnace cover which can be pivoted away, and at least one shaft-like charging material preheater which is arranged laterally on the furnace vessel and the interior of which is connected in its region adjoining its bottom to the interior of the furnace vessel through a connecting zone and which is also provided in its upper region with a charging opening for charging material and a gas outlet and in its lower region with burners or nozzles, in which said method the steps involve charging steel scrap charging material into the charging material preheater wherein a column of charging material which is heated in heat exchange relationship with hot gases of the furnace vessel and the burners is formed and melting said charging material in the lower region by the burners and under the heating action of arcs as well as in contact with a liquid sump in the furnace hearth, bringing the molten material in the furnace hearth to tapping temperature, and tapping the molten material such that after the tapping operation a residual molten material remains in the furnace hearth, wherein after the tapping operation the method of charging comprises the steps of;

charging a part of the amount of charging material required for the next melting directly into the furnace vessel and charging the remainder into the charging material preheater.

2. A method according to claim 1 characterised in that the part which is to be charged directly into the furnace vessel is preheated by gases which are withdrawn from the gas outlet of the charging material preheater during the preceding smelting process.

3. A method according to claim 1 characterised in that the part which is charged directly into the furnace vessel essentially comprises heavy and medium scrap.

4. A method according to claim 1 characterised in that the part which is charged directly into the furnace vessel contains lump or granulate crude iron.

5. A method according to claim 1 characterised in that the entire amount of charging material in the shaft-like charging material preheater is smelted in a smelting process.

6. A method according to claim 1, wherein after the tapping operation 20 to 50% by weight of the amount of charging material required for the next melting operation is charged directly into the furnace vessel.

7. A method according to claim 1, wherein charging of the preheater is performed in parallel to the direct charging.

8. A method according to claim 7, wherein that electric arc energy is introduced relative to the burner energy introduced in a ratio between 6:1 and 2:1.

9. A smelting unit including an electric arc furnace including a furnace vessel and a cover which can be pivoted away, at least one shaft-like charging material preheater which is arranged laterally on the furnace vessel and the interior of which is connected in a region adjoining its bottom to the interior of the furnace vessel through a connecting zone and which is also provided in its upper region with a closable charging opening for charging material and a gas outlet and in its lower region with burners or nozzles, the gas outlet of the shaft-like material preheater is connected to the gas inlet of a preheating chamber which is suitable for accommodating a container filled with charging material.

10. A smelting unit according to claim 9 wherein arranged in the bottom of the furnace vessel between the middle of the vessel and the vertical extension of the adjacent shaft wall is at least one nozzle or a gas-pervious bottom scavenging brick.

11. A smelting unit according to claim 10 wherein the nozzle or the smelting brick is disposed in the vicinity of the vertical extension of the shaft wall which is adjacent to the furnace vessel.

12. A smelting unit according to claim 9 wherein at least one of the electrodes of the arc furnace is displaced from the middle of the furnace vessel in the direction of the shaft-like charging material preheater.

13. A smelting unit according to one of claims 10 to 11 characterised in that the lowest point of the hearth space in the furnace vessel is in the region under the electrode or electrodes.

14. A smelting unit according to one of claims 10 to 11 characterised in that the bottom of the charging material preheater is designed to drop away towards the furnace hearth at an angle of inclination of greater than 30° and less than 60°.

15. A smelting unit according to one of claims 9 to 11 characterised in that the ratio of the height to the square root of the mean cross-section of the shaft-like charging material preheater is in the range of between 1.2 and 3.

16. A smelting unit according to one of claims 10 to 11 characterised in that the furnace vessel and the charging material preheater which is integrated therewith can be tilted about an axis joining the middle thereof to the middle of the vessel.

17. A smelting unit according to one of claims 10 to 11 characterised in that the cross-section of the interior of the charging material preheater is enlarged downwardly.

* * * * *